United States Patent
Ando

(10) Patent No.: US 7,129,665 B2
(45) Date of Patent: Oct. 31, 2006

(54) CONTROL APPARATUS FOR FEED DRIVING SYSTEM

(75) Inventor: Tomoharu Ando, Aichi (JP)

(73) Assignee: OKUMA Corporation, Niwa-gun (JP)

( * ) Notice: Subject to any disclaimer, the term of this patent is extended or adjusted under 35 U.S.C. 154(b) by 0 days.

(21) Appl. No.: 11/028,362

(22) Filed: Jan. 3, 2005

(65) Prior Publication Data

US 2005/0146301 A1    Jul. 7, 2005

(30) Foreign Application Priority Data

Jan. 7, 2004    (JP)    ............................. 2004-002297

(51) Int. Cl.
G05B 19/25    (2006.01)

(52) U.S. Cl. ................. 318/571; 318/560; 318/568.18; 318/573; 318/638; 318/640; 318/647; 318/652; 318/653; 318/654; 318/655; 318/656; 318/657; 318/658; 318/659; 318/660; 318/661

(58) Field of Classification Search ................ 318/560, 318/571, 568.18, 573, 638, 640, 647, 652–661
See application file for complete search history.

(56) References Cited

U.S. PATENT DOCUMENTS 6,501,997 B1 *  12/2002  Kakino ........................ 700/28
6,647,314 B1 *  11/2003  Kato et al. ................... 700/187

FOREIGN PATENT DOCUMENTS

| JP | 11-277469 | 10/1999 |
| JP | 2001-092508 | 4/2001 |
| JP | 2002-178237 | 6/2002 |
| JP | 2003-025263 | 1/2003 |

* cited by examiner

Primary Examiner—Lincoln Donovan
Assistant Examiner—Erick Glass
(74) Attorney, Agent, or Firm—Gauthier & Connors LLP

(57) ABSTRACT

A control apparatus for a machine that can be operated at high precision in a stable control state is provided by driving a movable body with control parameters suited to the mechanical state. A control parameter calculation circuit is provided to obtain control parameters for a drive apparatus control circuit for driving actuators in accordance with the conditions of actuator rotational velocity, the orientation of the movable body, and the position of the movable body, and a control parameter K for the drive apparatus control circuit is varied.

2 Claims, 10 Drawing Sheets

CONTROL APPARATUS FOR FEED DRIVING SYSTEM

BACKGROUND OF THE INVENTION

1. Field of the Invention

The present invention relates to a control apparatus in a feed driving system to be used in industrial robots, machine tools, and post-machining deburring machines.

2. Description of the Related Art

A parallel kinematic machine is one type of mechanism for driving a movable body by an actuator and driving and controlling the movable body to a free position and orientation with respect to a holding base. A known machine tool equipped with a spindle head 2, which is a body that is freely movable in six axial directions in a machining space, is shown in FIG. 19 as an apparatus of the prior art employing the parallel kinematic machine. In this machine tool, six universal joints 5 are respectively disposed on a holding base 7. A servo motor 6a, which supports the top end of a ball screw 4 at each universal joint 5 and is a rotary actuator for driving the ball screw 4, is installed. As shown in FIG. 20, a position detector 6b is mounted to each motor 6a.

The spindle head 2 is supported via the universal joint 3 at the bottom ends of the six ball screws 4 and a main spindle 8 is disposed at the spindle head so as to be pivotable. Then, by changing the position of the ball screws 4 between universal joints 3 and the universal joints 5, the arm lengths are changed and the spindle head 2 is positioned at an arbitrary orientation in the machining space and a workpiece on a table 1 is machined by a tool mounted to the main spindle 8. To the spindle head 2 are connected electrical wiring, such as electric supply lines and control signal lines for a main spindle drive motor, and piping for supplying fluids, such as pressurized oil for tool clamps, lubricating oil for bearings, and cooling water or cutting water. These wiring and piping are passed through a flexible tube 9 with leeway provided from the holding base 7 to the flexible tube 9.

A parallel kinematic machine tool performs feedback control independently at each of the 6 axes by utilizing the output from a position detector that is mounted to each servo motor. Control parameters for the servo system are .adjusted so that maximum feed velocity is obtained in the Cartesian coordinate system at various positions and orientations within the movable range. However, in the apparatus of the prior art, the same and fixed control parameters are used among the 6 axes.

SUMMARY OF THE INVENTION

A problem of the parallel kinematic machine of the prior art is that when control parameters are adjusted with the spindle head in a vertical state in proximity to the origin as shown by the solid line in FIG. 20, it becomes susceptible to the generation of vibrations when the spindle head is at a distance from the origin position with a tilted orientation as shown by the dotted line in FIG. 20. Furthermore, these vibrations are not noticeable when the servo motors rotate at low speeds and the feed velocity in the Cartesian coordinate system is low, but become evident when the servo motors rotate at high speeds and the feed velocity in the Cartesian coordinate system increases.

The inventors of the present invention have observed that this is caused by a change in mechanical rigidity due to the orientation and position of the spindle head and an increase in the vibration energy of the ball screws due to the high-speed rotation of servo motors at an orientation and position where the mechanical rigidity is low.

The mechanical rigidity with the spindle head in a vertical state in proximity to the origin as shown by the solid line in FIG. 20 and the mechanical rigidity with the spindle head in a tilted orientation at a distance from the origin position as shown by the dotted line differ greatly. As a result, even if the control parameters are adjusted with the spindle head in a vertical state in proximity to the origin, vibrations develop with the adjusted values for the servo system when the servo motors are rotated at high speeds at a position and orientation shown by the dotted line.

Therefore, the control parameters for the actuators in the prior art were set to small values so that vibration was not generated even within the movable range of the parallel kinematic machine at all positions, orientations, and maximum feed velocity in the Cartesian coordinate system. As a result, a problem in the prior art was that the feed velocity was limited more than necessary, causing the machining efficiency of the machine tool to decrease.

To solve these issues, the present invention provides a control apparatus for the feed driving system that is capable of improving maneuverability while maintaining control stability of the machine.

The present invention is characterized by a control apparatus for a feed driving system comprising a drive apparatus control circuit for driving a movable body using an actuator and freely changing the position and orientation of the movable body with respect to a holding base and a numerical control apparatus for providing a command for controlling the actuator to the drive apparatus control circuit, where the control apparatus for the feed driving system for varying control parameters for the drive apparatus control circuit in accordance with the travel velocity of the movable body and the position or the orientation of the movable body includes a control parameter calculation circuit for varying control parameters for the drive apparatus control circuit in accordance with the feed velocity of the actuator and the position or the orientation of the movable body.

Furthermore, the control parameter calculation circuit of the present invention varies control parameters on the basis of an interpolated position of the movable body set by a numerical control apparatus and the feed velocity of the movable body set by the drive apparatus control circuit.

Moreover, the present invention is characterized by a control apparatus for a feed driving system comprising a drive apparatus control circuit for driving a movable body using an actuator and freely changing the position and orientation of the movable body with respect to a holding base and a numerical control apparatus for providing a command to the drive apparatus control circuit to control the actuator, where the control apparatus for the feed driving system for limiting the feed velocity as instructed by the numerical control apparatus includes a limit feed velocity calculation circuit for setting a limit feed velocity in accordance with the position or the orientation of the movable body.

Since the control parameters for driving the ball screws are varied in the present invention in accordance with the position and orientation of the spindle head and the rotational velocity of the actuator, optimum control parameters can be used to suit the mechanical state so that a high-precision machine can be realized.

Furthermore, since the feed velocity that is expressed in the Cartesian coordinate system is varied in accordance with the position and orientation of the spindle head, a maximum feed velocity to suit the mechanical state can be used so that a high speed, high efficiency machine can be realized.

DETAILED DESCRIPTION OF THE PREFERRED EMBODIMENTS

Figure 1:
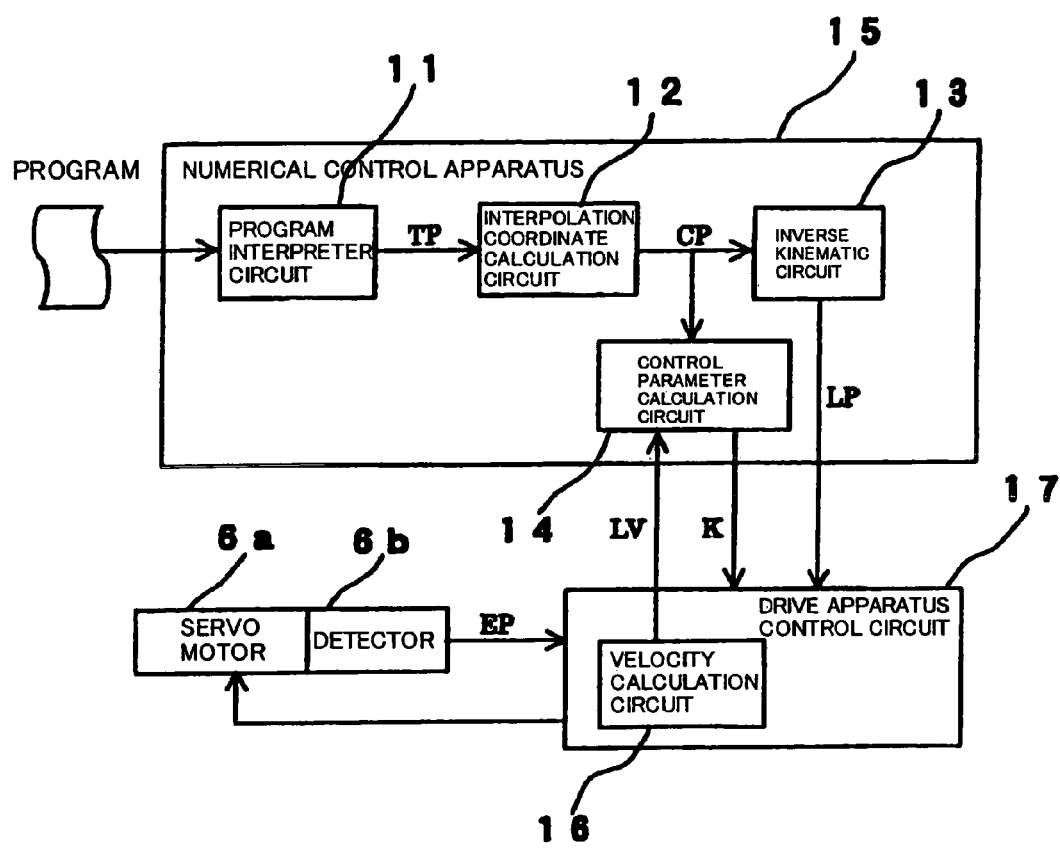
FIG. 1 is a block diagram of a control apparatus showing a first embodiment of an apparatus of the present invention.

The present invention will be described with regard to embodiments that apply to a parallel kinematic machine tool. FIG. 1 is a block diagram showing an embodiment of a control apparatus for a parallel kinematic machine tool relating to the present invention. A program interpreter circuit 11 in a numerical control apparatus 15 interprets a machining program one block at a time and outputs it to an interpolated coordinate calculation circuit 12 as a target position TP for a movable body that is expressed in Cartesian coordinates.

The interpolated coordinate calculation circuit 12 obtains an interpolated position CP that is expressed in Cartesian coordinates. Furthermore, an inverse kinematic circuit 13 converts the interpolated position CP, which is expressed in Cartesian coordinates, to a ball screw position, namely, a ball screw arm length LP, and outputs it to a drive apparatus control circuit 17. The drive apparatus control circuit 17 drives the servo motor 6a according to the ball screw arm length L. The amount driven is controlled by feedback according to the output from the position detector 6b that is mounted to each servo motor. Each ball screw, which is driven by the respective servo motor 6a, is respectively moved to a desired position. As a result, this controls the spindle head to a desired position and orientation.

A velocity calculation circuit 16 for the drive apparatus control circuit 17 calculates the rotational velocity LV of the servo motor 6a by using information from the position detector 6b. This embodiment is characterized by a control parameter calculation circuit 14 using the interpolated position CP and rotational velocity LV to calculate the control parameter K and then output it to the drive apparatus control circuit 17.

Figure 2:
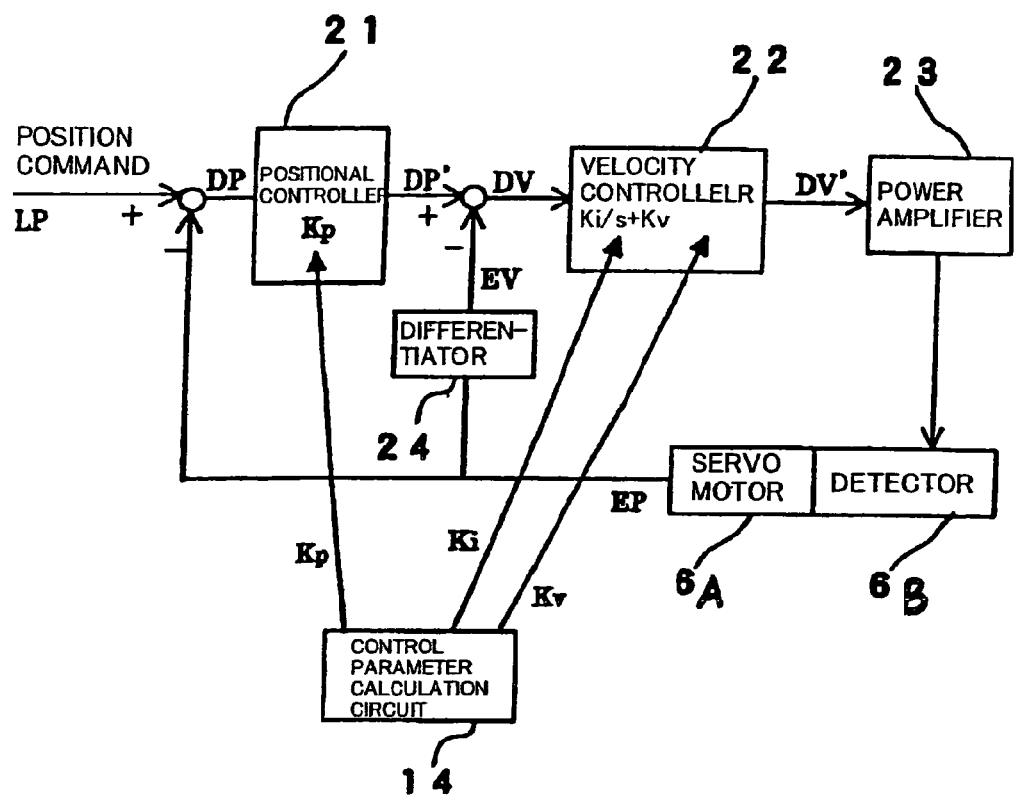
FIG. 2 is a servo system block diagram of a drive control apparatus showing the first embodiment of the apparatus of the present invention.

The configuration of the servo system for the drive apparatus control circuit 17 will be described with reference to FIG. 2. A position command LP from the numerical control apparatus 15 and the current position EP from the position detector 6b are compared, a position deviation DP is calculated, and DP' is calculated by multiplying a position loop gain Kp at a position controller 21. Next, a difference DV between a value EV, after the current position EP from the position detector 6b is differentiated by a differentiator 24, and DP' is calculated. Furthermore, a value after the difference DV is integrated by a velocity controller 22 and multiplied by an integration gain Ki and a value after DV is multiplied by a proportional gain Kv are added to calculate DV'. DV' is input by a power amplifier 23 and the servo motor 6a is driven. The above-mentioned gain values of Kp, Ki, and Kv are calculated by the control parameter calculation circuit 14.

Therefore, according to this embodiment, optimum gain values Kp, Ki, and Kv are obtained on the basis of the rotational velocity LV that is provided by the velocity calculation circuit 16 in the drive apparatus control circuit 17 and the interpolated position CP that is provided by the interpolated coordinate calculation circuit 12 in the numerical control apparatus 15. Thus, according to this embodiment, when the spindle head is in the proximity of the origin, the various K parameters are set to large values, the response speed of the spindle head is raised, and the locus accuracy can be improved. On the other hand, when the spindle head is in a tilted position in the periphery, the various K parameters are adjusted to small values. As a result, the response speed is reduced and the locus accuracy drops although satisfactory machining without vibration is possible.

Figure 3:
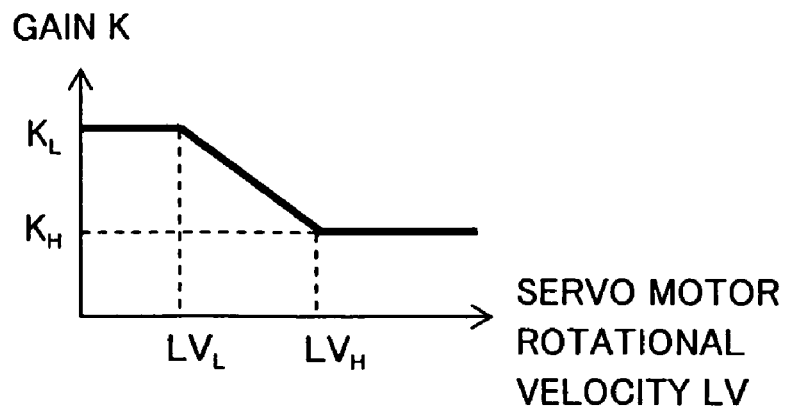
FIG. 3 is a diagram showing the relationship between the rotational velocity LV of a servo motor and gain K.

An embodiment of the control parameter calculation circuit 14 will be described hereinafter with reference to FIGS. 3, 4, and 5. FIG. 3 shows the relationship between the rotational velocity LV of the servo motor and the gain K, where the gain is a high fixed value $K_L$ at low velocities to $LV_L$, and a low fixed value $K_H$ at high velocities from $LV_H$. With the rotational velocity of the servo motor in the region between $LV_L$ and $LV_H$, the gain is decreased in a linear manner from $K_L$ to $K_H$. Here, the values for $LV_L$ and $LV_H$ are fixed.

Figure 4:
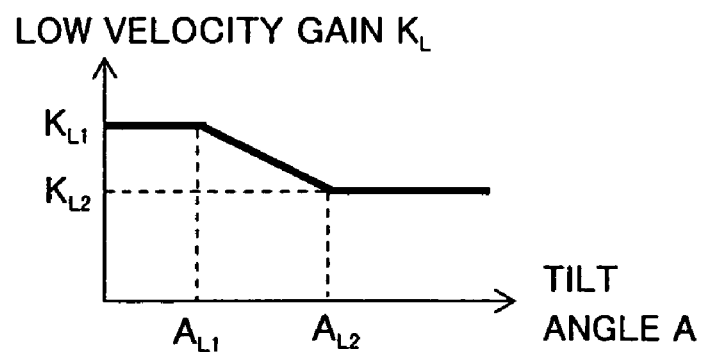
FIG. 4 is a diagram showing the relationship between low-velocity gain $K_L$ and tilt angle A.
Figure 5:
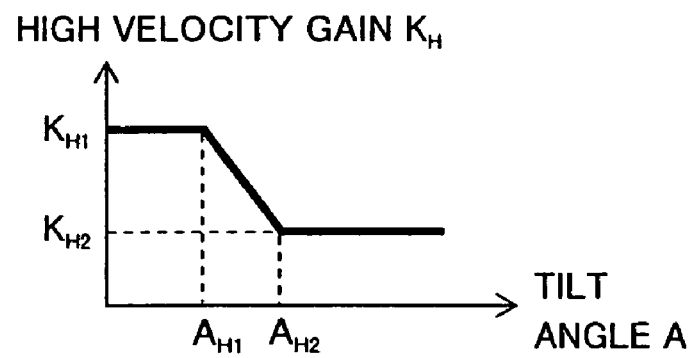
FIG. 5 is a diagram showing the relationship between high-velocity gain $K_H$ and tilt angle A.

The low-velocity gain $K_L$ used in FIG. 3 is changed in accordance with the tilt angle (orientation) as shown in FIG. 4. When the tilt angle is $A_{L1}$ or smaller, the gain is a high fixed value $K_{L1}$, and when the tilt angle is larger than $A_{L2}$, the gain is a low fixed value $K_{L2}$. In the region between $A_{L1}$ and $A_{L2}$, the gain is decreased in a linear manner from $K_{L1}$ to $K_{L2}$. Similarly, the high-velocity gain $K_H$ used in FIG. 3 is changed in accordance with the tilt angle as shown in FIG. 5. When the tilt angle is $A_{H1}$ or smaller, the gain is a high fixed value $K_{H1}$, and when the tilt angle is larger than $A_{H2}$, the gain is a low fixed value $K_{H2}$. In the region between $A_{H1}$ and $A_{H2}$, the gain is decreased in a linear manner from $K_{H1}$ to $K_{H2}$.

Figure 6:
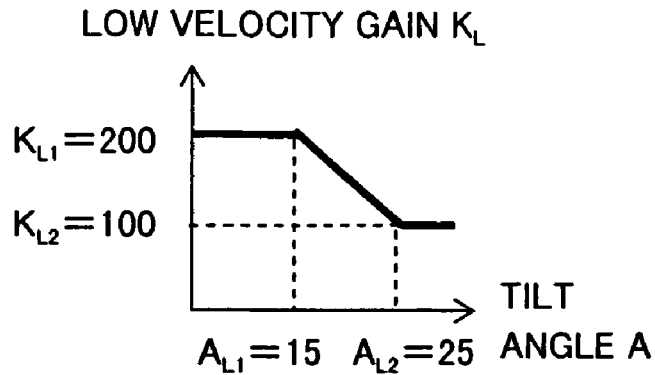
FIG. 6 is a diagram showing the relationship between low-velocity gain $K_L$ and tilt angle A.
Figure 7:
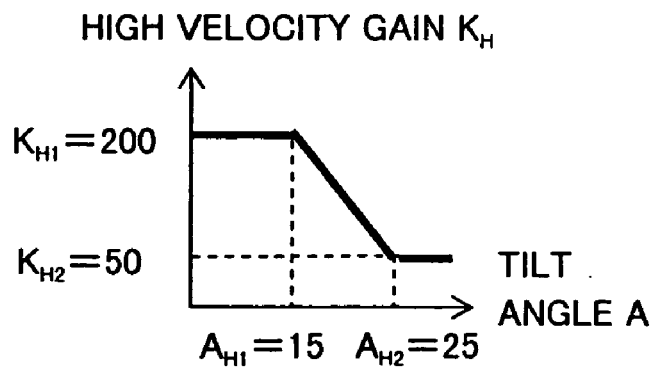
FIG. 7 is a diagram showing the relationship between high-velocity gain $K_H$ and tilt angle A.
Figure 8:
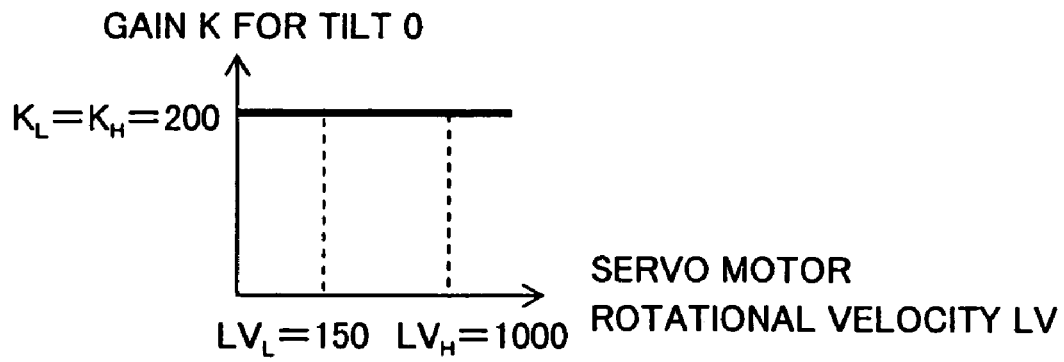
FIG. 8 is a diagram showing the relationship between the rotational velocity LV of the servo motor when the tilt angle is 0 and gain K.

The gain setting are given in FIGS. 6 and 7 where the relationship of the low-velocity gain $K_L$ and the high-velocity gain $K_H$ with the tilt angle A are respectively shown for low velocity of $LV_L=150$, high velocity of $LV_H=1000$, low-velocity gain 1 of $K_{L1}=200$, low velocity gain 2 of $K_{L2}=100$, high-velocity gain 1 of $K_{H1}=200$, high velocity gain 2 of $K_{H2}=50$, low-velocity tilt angle 1 of $A_{L1}=15$, low-velocity tilt angle 2 of $A_{L2}=25$, high-velocity tilt angle 1 of $A_{H1}=15$, and high-velocity tilt angle 2 of $A_{H2}=25$. Since the low-velocity gain $K_L$ and the high-velocity gain $K_H$ are both the same value of 200 for tilt angle A=0, the relationship between the rotational velocity of the servo motor and the gain is shown in FIG. 8 where the gain is a fixed value independent of the rotational velocity. Furthermore, when the tilt angle is A=25, the low-velocity gain is $K_L=100$ and the high-velocity gain is $K_H=50$ to result in the relationship between the velocity and the gain shown in FIG. 9.

Figure 9:
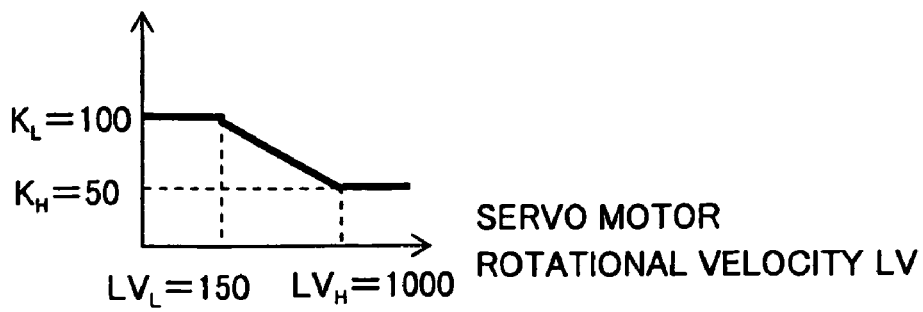
FIG. 9 is a diagram showing the relationship between the rotational velocity LV of the servo motor when the tilt angle is 25 and gain K.

Since the mechanical rigidity is high when the tilt angle is 0, the gain can be set high independently of the rotational velocity as shown in FIG. 8. However, as shown in FIG. 9, the mechanical rigidity is low when the tilt angle is 25 compared to a tilt angle of 0, and it is necessary to set a lower gain. It becomes possible to set a slightly higher gain provided the rotational velocity of the motor is low.

In this embodiment, a method was given to vary the gain according to the orientation (tilt angle) and the rotational velocity of the servo motor. However, the inclusion of further positional conditions enables optimum control parameters to be set.

Figure 10:
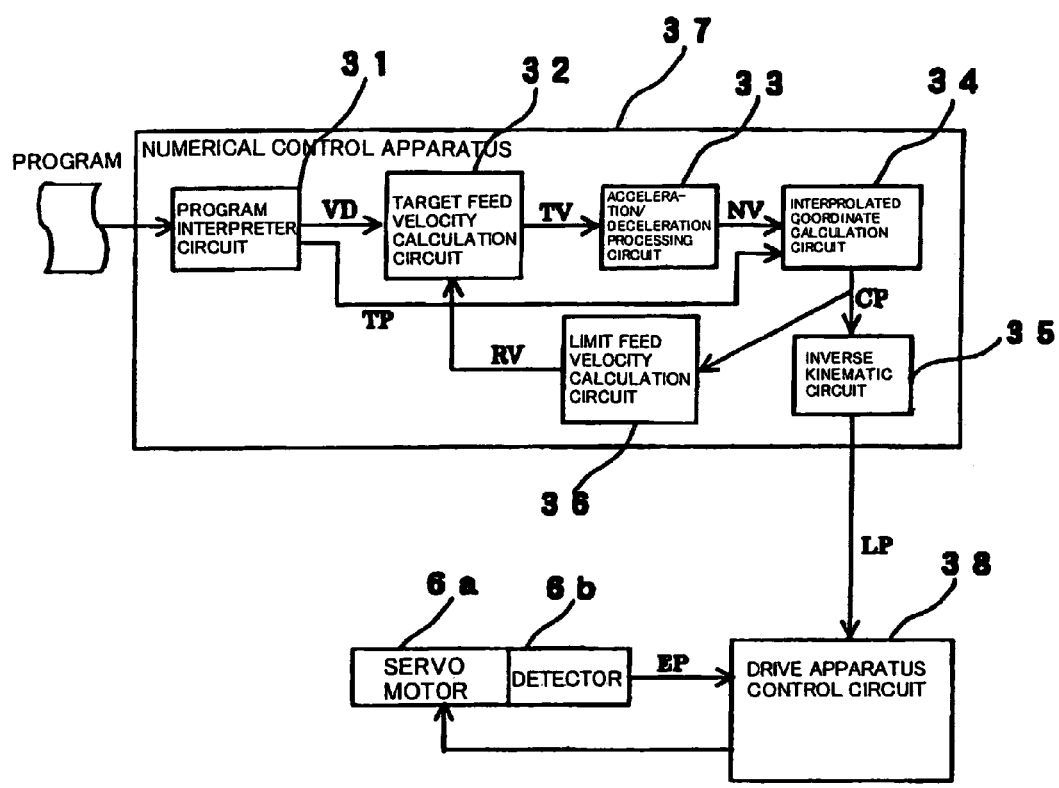
FIG. 10 is a block diagram of a control apparatus showing a second embodiment of an apparatus of the present invention.

Another embodiment of the control apparatus for a parallel kinematic machine tool relating to the present invention will be described next with reference to FIG. 10. A program interpreter circuit 31 in a numerical control apparatus 37 interprets a machining program one block at a time and outputs feed velocity data VD for a movable body that is expressed in Cartesian coordinates and target position TP for the movable body that is expressed in Cartesian coordinates to a target feed velocity calculation circuit 32 and an interpolated coordinate calculation circuit 34, respectively.

The target feed velocity calculation circuit 32 outputs a target feed velocity TV that is expressed in Cartesian coordinates prior to acceleration/deceleration processing from the feed velocity data VD to an acceleration/deceleration processing circuit 33. The acceleration/deceleration processing circuit 33 performs acceleration or deceleration processing toward the target feed velocity TV, and a feed velocity NV at this time resulting from acceleration/deceleration processing is obtained in Cartesian coordinates.

The interpolated coordinate calculation circuit 34 obtains an interpolated position CP that is expressed in Cartesian coordinates from the target position TP and the feed velocity NV at this time resulting from acceleration/deceleration processing. Furthermore, an inverse kinematic circuit 35 converts the interpolated position CP that is expressed in Cartesian coordinates into ball screw arm length LP and outputs it to a drive apparatus control circuit 38. The drive apparatus control circuit 38 controls the drive for the servo motor 6a that is mounted to the arm according to the ball screw arm length LP.

This embodiment is characterized by the interpolated position CP being also output to a limit feed velocity calculation circuit 36 and a limit feed velocity RV being output to the target feed velocity calculation circuit 32 in accordance with position and orientation. At the target feed velocity calculation circuit 32, the feed velocity data VD and the limit feed velocity RV are compared and the smaller feed velocity is adopted.

Therefore, according to this embodiment, the feed velocity of the spindle head is limited according to the position of the spindle head by the interpolated position CP of the interpolated coordinated calculation circuit 34 so that the feed is performed speedily when the spindle head is freely movable in the proximity of the origin and the feed is performed slowly for the tilted spindle head in the periphery. As a result, it becomes possible to suppress vibration while setting the machining to maximum efficiency.

Figure 11:
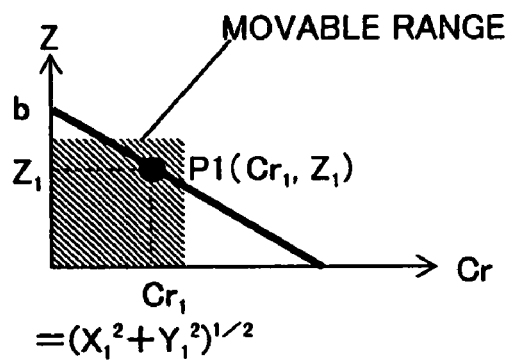
FIG. 11 is a diagram showing the current position P1 and feed velocity criterion line.

An embodiment of the limit feed velocity calculation circuit 36 will be described hereinafter with reference to FIGS. 11, 12, and 13. As a method to limit the movable region in a parallel kinematic machine tool, a limiting method using a columnar region is suitable as disclosed in patent document 4 (Japanese Patent Laid-Open Publication No. 2003-25263). It considers a machine in which the movable region is limited by a column shape in cylindrical coordinates as shown by the shaded part in FIG. 11. Using the current position $P_1$ ($Cr_1$, $Z_1$) and the feed velocity criterion line that is expressed by $Z=a \times Cr+b$ in FIG. 11, the feed velocity coefficient b, which is an intercept of the line, is obtained. Here, $Cr_1=(X_1^2+Y_1^2)^{1/2}$ and the slope a is a fixed value.

Figure 12:
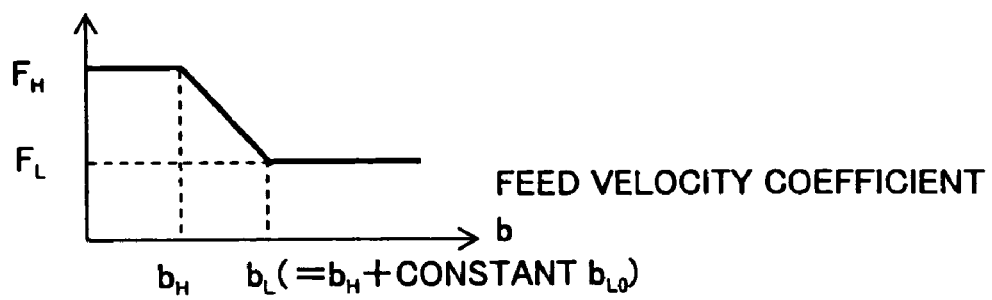
FIG. 12 is a diagram showing the relationship between feed velocity F and feed velocity coefficient b.

FIG. 12 represents the relationship between the feed velocity F and the feed velocity coefficient b, where F is determined using b that was obtained from the feed velocity criterion line. When b is less than or equal to $b_H$, the feed velocity is fixed at a high feed velocity $F_H$. When b is greater than $b_L$, the feed velocity is fixed at a low feed velocity $F_L$. With b in the region between $b_H$ and $b_L$, the feed velocity is reduced in a linear manner from $F_H$ to $F_L$. Here, $F_H$ and $F_L$ are fixed values.

Figure 13:
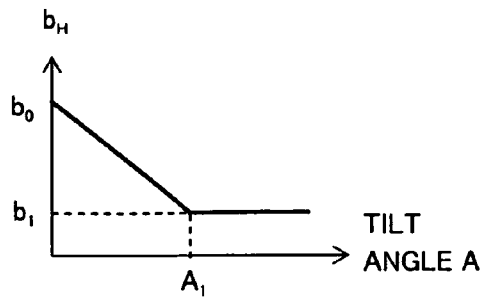
FIG. 13 is a diagram showing the relationship between high feed velocity coefficient $b_H$ and tilt angle A.

Value $b_H$ in FIG. 12 is determined in FIG. 13 by tilt angle A and $b_L$ is a value in which a fixed feed velocity coefficient additional value $b_{L0}$ is added to $b_H$. FIG. 13 represents the relationship between the high feed velocity coefficient $b_H$ and the tilt angle A. When A is less than or equal to $A_1$, $b_H$ varies from $b_0$ to $b_1$ according to the tilt angle, and when A is greater than $A_1$, $b_H$ is fixed at $b_1$.

Figure 14:
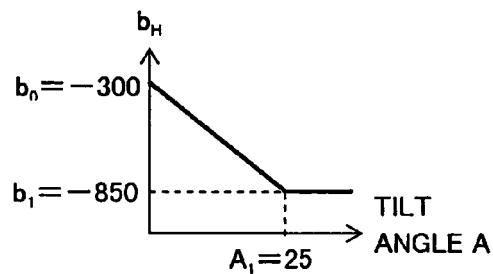
FIG. 14 is a diagram showing the relationship between high feed velocity coefficient $b_H$ and tilt angle A.

A method to determine the feed velocity will be described with specific set values. When the slope of the feed velocity criterion line is a=−0.83, the high feed velocity is $F_H=100$, the low feed velocity is $F_L=10$, the feed velocity coefficient additional value is $b_{L0}=200$, the feed velocity coefficient 1 is $b_1=-300$, the feed velocity 2 is $b_2=-850$, and the tilt angle 1 is $A_1=25$, the relationship between the $b_H$ and the tilt angle A is shown in FIG. 14.

A method to determine the feed velocity when the tilt angle is 0 will be described. The high feed velocity coefficient $b_H$ is −300 and the low feed velocity coefficient $b_L$ is −100 to result in the relationship between the feed velocity F for tilt angle 0 and the feed velocity coefficient b shown in FIG. 15. At tilt angle 0, the feed velocity criterion line for b=−100 is shown in FIG. 16 as a dotted line and the feed velocity criterion line for b=−300 is shown as a solid line. FIG. 16 also shows the movable range as a shaded part.

Figure 15:
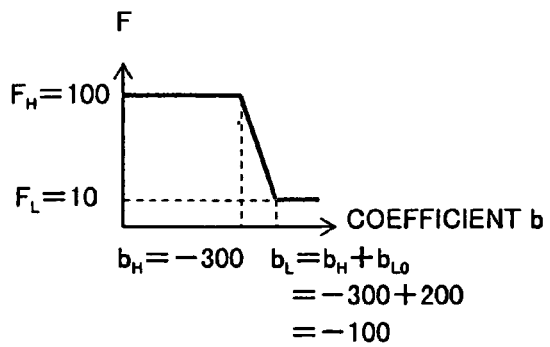
FIG. 15 is a diagram showing the relationship between the feed velocity F when the tilt angle is 0 and feed velocity coefficient b.
Figure 16:
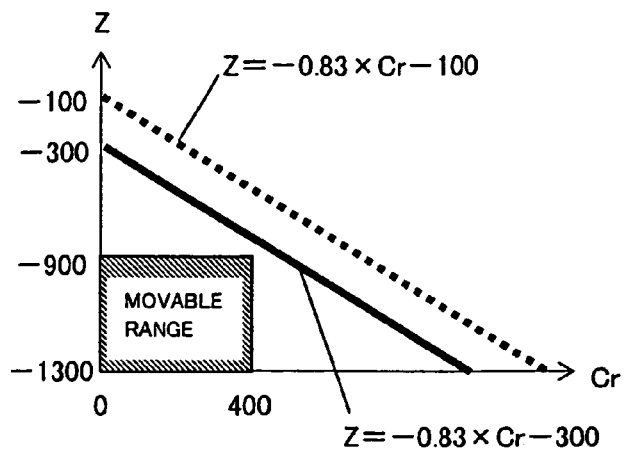
FIG. 16 is a diagram showing the movable range and the feed velocity criterion line when the tilt angle is 0.

According to FIG. 15, the feed velocity is a fixed value at 100 when b is −300 or lower. Namely, in the region enclosed by the solid line, the Z axis, and the Cr axis, the feed velocity is a fixed value of 100. Since the entire movable range is included in this region, the feed velocity is 100 in the entire movable range when the tilt angle is 0.

Figure 17:
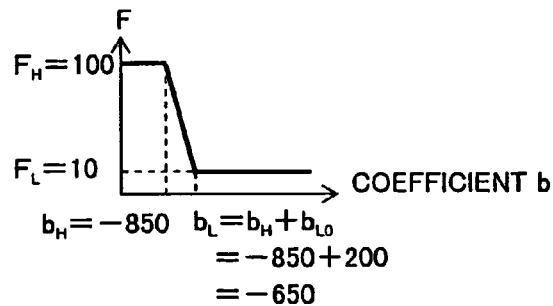
FIG. 17 is a diagram showing the relationship between the feed velocity F when the tilt angle is 25 and feed velocity coefficient b.
Figure 18:
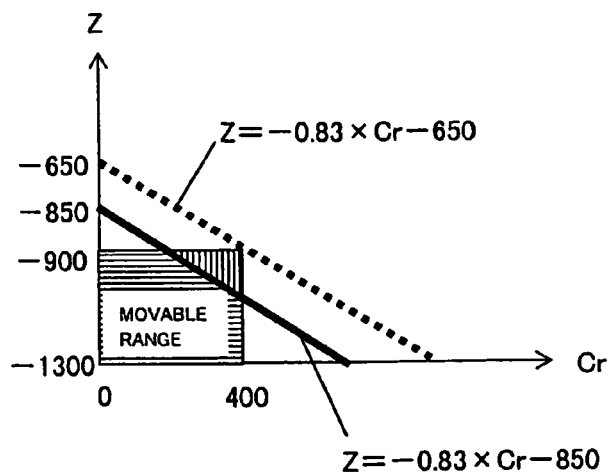
FIG. 18 is a diagram showing the movable range and the feed velocity criterion line when the tilt angle is 25.
Figure 19:
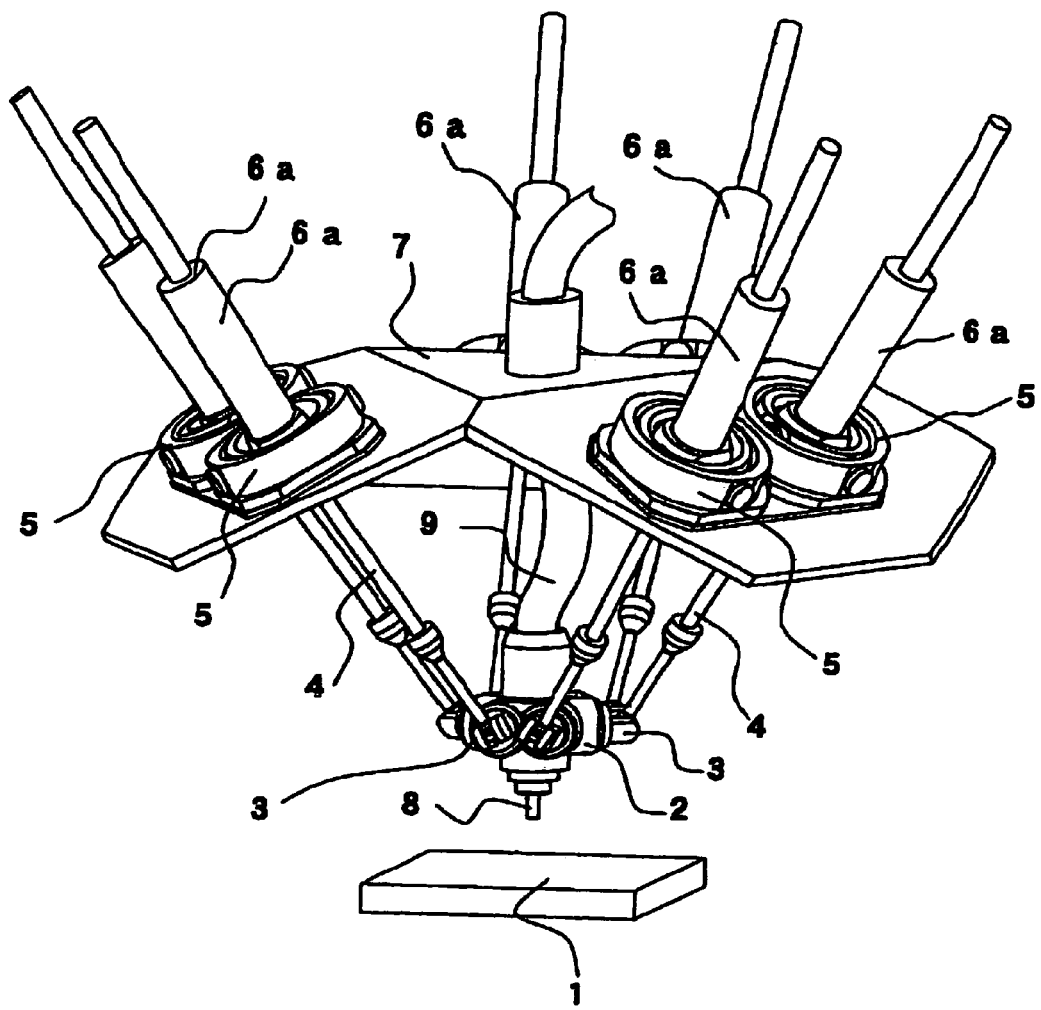
FIG. 19 is an overall drawing of a prior art machine tool that applies the parallel kinematic machine.
Figure 20:
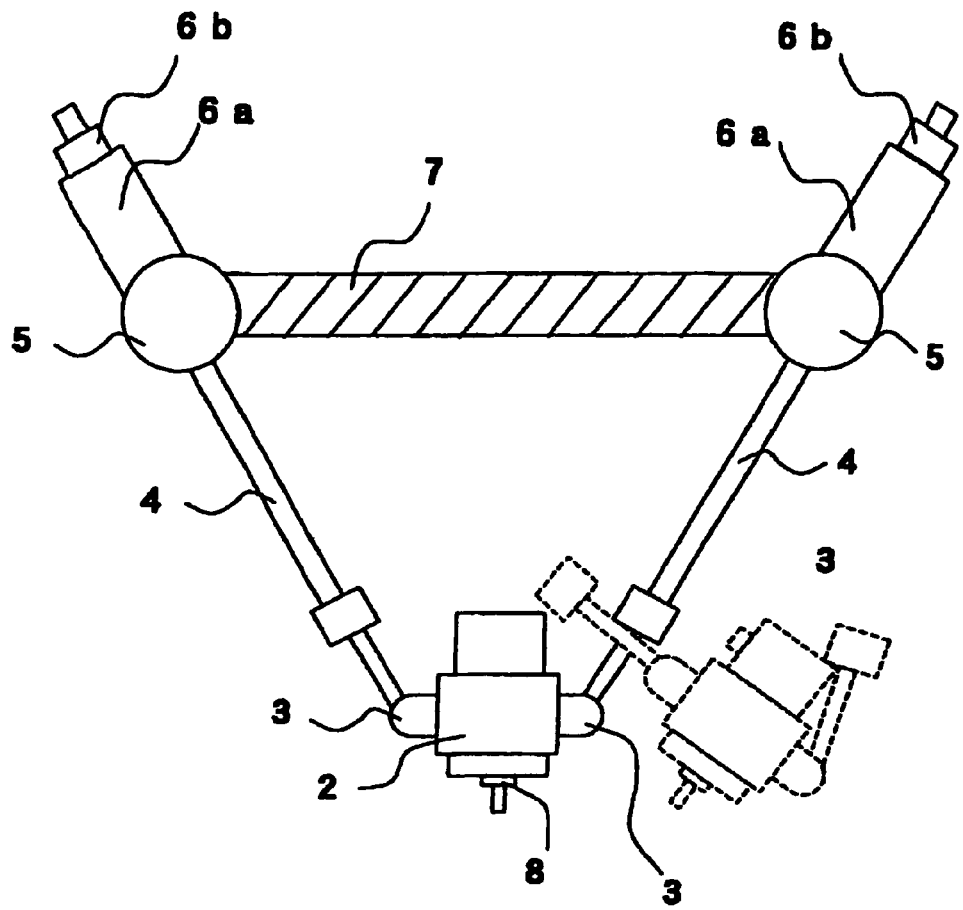
FIG. 20 illustrates a mechanical state of a prior art machine tool that applies the parallel kinematic machine.

Next, a method to determine the feed velocity when the tilt angle is 25 will be described. The high feed velocity coefficient $b_H$ is −850 and the low feed velocity coefficient $b_L$ is −650 to result in the relationship between the feed velocity F for tilt angle 25 and the coefficient b shown in FIG. 17. The feed velocity criterion line for b=−650 is shown in FIG. 18 as a dotted line and the feed velocity criterion line for b=−850 is shown as a solid line. FIG. 18 also shows the movable range as the parts with vertical line shading and horizontal line shading. According to FIG. 17, since the feed velocity is a fixed value of 100 with b at −850 or less, the feed velocity is a fixed value of 100 in the region (part with horizontal line shading) enclosed by the solid line, Z axis, and Cr axis so that the movable range in this region moves at the feed velocity of 100. In the region of the part with vertical line shading, the feed velocity varies from 100 to 10 depending on the value of b.

The mechanical rigidity is high when the tilt angle is 0 and start and stop movements in the entire movable range can be performed at maximum velocity. However, when the tilt angle is 25, the mechanical rigidity decreases in the movable range shown in FIG. 18 as the part with vertical line shading. Therefore, the feed velocity in this region is suppressed so that it is necessary to reduce the acting force during start and stop and to prevent flexural vibration.

In the above-mentioned embodiments, parallel kinematic machine tools having 6 degrees of freedom in space were illustrated. However, the present invention may also be applicable to large-scale machine tools having different mechanical states at the spindle head position and not only to the parallel kinematic machine. The present invention is applicable not only to machine tools equipped with 6 degrees of mechanical freedom but also to machine tools with more or less degrees of freedom. Furthermore, in the description for the embodiment shown in FIGS. 1 and 2, a control apparatus was presented in which control parameters were varied in accordance with all of the conditions, such as the orientation and position of the spindle head and the rotational velocity of the servo motor. However, the control parameters may be varied in accordance with only a single condition or with a combination of these conditions. Similarly, in the embodiment of FIG. 10, the allowable feed velocity in the Cartesian coordinate system may be obtained using only one condition of either the orientation or position of the spindle head.

Patent document 1 (Japanese Patent Laid-Open Publication No. 2002-178237) discloses a prior art in a parallel kinematic machine in which a load fluctuates with a change in the position of a movable body and a driving force is instructed to correspond to the load so as to prevent a response delay from occurring. However, in this prior art, an apparatus was not disclosed for varying the control parameters to set an optimum feed velocity to prevent vibration.

Particularly, in patent document 1, since the driving force corresponding to the load acting on the arm is added outside the control loop, it does not deal with the vibration of the servo system that develops due to mechanical characteristics (particularly, the changing mechanical rigidity due to position or orientation). On the other hand, the present embodiment can deal with the vibration issue since the control parameters within the control loop are varied in accordance with the mechanical characteristics.

Furthermore, in patent document 1, it was necessary to perform various movements and set low control parameters so that vibrations do not develop. In comparison, this embodiment is advantageous in that high control parameters can be set in a state where the mechanical characteristics are stable so that a high-precision machine can be realized.

To prevent the generation of vibrations in parallel kinematic machines, a prior art is disclosed in patent document 2 (Japanese Patent Laid-Open Publication No. Hei 11-277469) in which the control parameters for servo units are changed to control the load for each arm. However, in this prior art, there is no disclosure of an apparatus for adjusting the feed velocity of a movable body by adjusting the control parameters.

In patent document 2, the vibrations generated in the parallel kinematic machine are said to be caused by the change in the load acting on the arm due to position and orientation. However, the inventors of the present invention have empirically determined that these vibrations are not the result of changes in the load acting on the arms but due to overall mechanical rigidity of the movable body including the arms and universal joints. Accordingly, the control parameters are varied in this embodiment in accordance with the mechanical rigidity (position and orientation). Namely, small control parameters are set for positions and orientations of low mechanical rigidity and large control parameters are set for positions and orientations of high mechanical rigidity. Furthermore, even in positions and orientations where the mechanical rigidity is low, it can be appreciated that large control parameters can be set in regions where the velocity of the movable body is low, and a high-precision machine can be realized even for positions and orientations where the mechanical rigidity is low.

Patent document 3 (Japanese Patent Laid-Open Publication No. 2001-92508) discloses an apparatus for controlling the feed velocity of a movable member so that a change in leg velocity does not exceed a maximum allowable velocity. However, in this conventional apparatus, there is no disclosure regarding the setting of an optimum feed velocity to prevent vibrations.

Particularly, patent document 3 discloses an apparatus for limiting the velocity of a movable body so that the leg velocity does not exceed the allowable velocity of an actuator. In the apparatus, the velocity of the movable body is not limited on the condition the allowable velocity of the actuator is not exceeded. However, if high-velocity start and stop movements are performed at positions and orientations where the mechanical rigidity is low, flexural vibrations of the arm are generated, thereby reducing not only the locus accuracy but also the mechanical life.

This embodiment makes it possible to prevent flexural vibrations during the starting and stopping of movements by limiting the velocity of the movable body at the positions and orientations where the mechanical rigidity is low.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A control apparatus for a feed driving system, comprising:
    a drive apparatus control circuit for driving a movable body using an actuator and freely changing the position and orientation of the movable body with respect to a holding base; and a numerical control apparatus for providing a command for controlling said actuator to said drive apparatus control circuit; wherein said control apparatus for the feed driving system, includes a control parameter calculation circuit for newly calculating control parameters for the drive apparatus control circuit in accordance with a feed velocity of the actuator and the position or the orientation of the movable body; and control parameters for the drive apparatus control circuit are varied in accordance with a travel velocity of the movable body and the position or the orientation of the movable body based on the control parameters newly calculated by the control parameter calculation circuit.

2. The control apparatus for the feed driving system according to claim 1, wherein:

the control parameter calculation circuit newly calculates control parameters on the basis of an interpolated position of the movable body set by the numerical control apparatus and the feed velocity of the movable body set by the drive apparatus control circuit.

* * * * *